(12) United States Patent
Haynes et al.

(10) Patent No.: US 11,447,257 B2
(45) Date of Patent: Sep. 20, 2022

(54) SYSTEMS AND METHODS FOR SOFT COVER ATTACHMENT

(71) Applicant: GOODRICH CORPORATION, Charlotte, NC (US)

(72) Inventors: Timothy C. Haynes, Prescott Valley, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 1111 days.

(21) Appl. No.: 16/029,464

(22) Filed: Jul. 6, 2018

(65) Prior Publication Data

US 2020/0010204 A1 Jan. 9, 2020

(51) Int. Cl.
*B64D 25/14* (2006.01)
*B65D 73/00* (2006.01)

(52) U.S. Cl.
CPC ........... *B64D 25/14* (2013.01); *B65D 73/00* (2013.01); *B65D 73/0021* (2013.01); *D10B 2403/023* (2013.01); *Y10S 244/905* (2013.01); *Y10T 428/24025* (2015.01); *Y10T 428/24273* (2015.01)

(58) Field of Classification Search
CPC ...................................... B64D 25/14
See application file for complete search history.

(56) References Cited

U.S. PATENT DOCUMENTS

| | | | | |
|---|---|---|---|---|
| 2,959,278 A * | 11/1960 | Mitchell | ........... | B63C 9/22 52/2.17 |
| 3,910,532 A * | 10/1975 | Fischer | ........... | B64D 25/14 244/905 |
| 4,441,582 A * | 4/1984 | Ward, Jr. | ........... | B64D 25/14 182/48 |
| 2004/0094671 A1 * | 5/2004 | Moro | ........... | B64D 25/14 244/137.2 |
| 2008/0099621 A1 * | 5/2008 | Hintzman | ........... | B64D 25/14 244/137.2 |
| 2016/0311543 A1 * | 10/2016 | Schmidt | ........... | B64D 25/14 |

* cited by examiner

*Primary Examiner* — Tye William Abell
(74) *Attorney, Agent, or Firm* — Snell & Wilmer L.L.P.

(57) ABSTRACT

A softcover for an evacuation system may comprise a fabric panel. The fabric panel may define a plurality of apertures located proximate a first end of the first fabric panel. A plurality of straps may extend from a second end of the fabric panel. The straps may be configured to secure the fabric panel to a housing configured to receive an inflatable slide.

9 Claims, 11 Drawing Sheets

SYSTEMS AND METHODS FOR SOFT COVER ATTACHMENT

FIELD

The disclosure relates generally to aircraft evacuation systems and, more particularly, to systems and methods for softcover attachment.

BACKGROUND

Emergency evacuation systems may be used to exit an aircraft absent a jet way or other suitable means of egress for passengers. Off-wing evacuation systems may include a fabric retention device, often referred to as a "softcover," that secures an evacuation slide within a storage container or packboard. The softcover may have two fabric panels attached to the packboard forming a lid over the evacuation slide. The fabric panels may be laced together such that release of the lacing allows the fabric panels to open and the evacuation slide to deploy. Current evacuation systems may attach the softcover to the packboard via a plurality of inserts configured to receive a screw or other type fastener. The inserts and fasteners can be time consuming to install and expensive to produce.

SUMMARY

A softcover for an evacuation system is disclosed herein. In accordance with various embodiments the softcover may comprise a first fabric panel defining a plurality of first apertures located proximate a first end of the first fabric panel. One or more first straps may extend from a second end of the first fabric panel opposite the first end of the first fabric panel.

In various embodiments, the first straps may each be configured as a loop. In various embodiments, a plurality of brackets may be coupled to the one or more first straps.

In various embodiments, the one or more first straps may comprise a plurality of chords configured to form a daisy chain.

In various embodiments, the soft cover may further comprise a second fabric panel. The second fabric panel may define a plurality of second apertures located proximate a first end of the second fabric panel. One or more second straps may extend from a second end of the second fabric panel opposite the first end of the second fabric panel.

In various embodiments, the first straps may each comprise a first portion extending from the second end of the first fabric panel, and a second portion stitched to the first portion. An end of the second portion may be configured to extend away from the first portion.

An evacuation system is also disclosed herein. In accordance with various embodiments, the evacuation system may comprise a housing configured to receive an inflatable slide. The housing may define a first aperture. A softcover may be coupled to the housing. The softcover may comprise a first fabric panel. The first fabric panel may comprise first strap extending from a first end of the first fabric panel. The first strap may be located through the first aperture of the housing.

In various embodiments, a bracket may be coupled to the first strap. A length of the bracket may be less than a length of the first aperture, a width of the bracket may be greater than a width of the first aperture.

In various embodiments, a rod may be located through the first strap. In various embodiments, the first fabric panel may comprise a plurality of chords extending from the first end of the first fabric panel. The plurality of chords may include the first strap. The plurality of chords may be configured in a daisy chain.

In various embodiments, the softcover may further comprise a second fabric panel. The second fabric panel may comprise a second strap extending from a first end of the second fabric panel. The second strap may be located through a second aperture of the housing. A lace may couple the first fabric panel to the second fabric panel.

In various embodiments, the first strap may comprise a first portion extending through the first aperture of the housing, and a second portion stitched to the first portion. An end of the second portion may be disposed on an external surface of the housing.

A method of installing a softcover in an evacuation system is also disclosed herein. In accordance with various embodiments, the method may comprise disposing a first end of a first fabric panel proximate an internal surface of a housing configured to receive an inflatable slide. The first fabric panel may comprise a plurality of first straps extending from the first end of the first fabric panel. The method may further comprise locating the plurality of first straps through a plurality of first apertures defined by the housing, and securing the first straps to the housing.

In various embodiments, the first straps may each be configured as a loop, and securing the first straps to the housing may comprise locating a rod through the first straps.

In various embodiments, securing the first straps to the housing may comprise configuring the first straps in a daisy chain over an external surface of the housing, and coupling a shackle to a key loop of the daisy chain.

In various embodiments, the method may further comprise coupling a plurality of brackets to the plurality of first straps, and securing the first straps to the housing may comprise locating the plurality of brackets over an external surface of the housing.

In various embodiments, the first straps may each comprise a first portion extending from the first end of the first fabric panel, and a second portion attached to the first portion, and securing the first straps to the housing may comprise locating the second portion on an external surface of the housing.

In various embodiments, the method may further comprise disposing a first end of a second fabric panel proximate the internal surface of the housing, locating the plurality of second straps of the second fabric panel through a plurality of second apertures defined by the housing, and securing the plurality of second straps to the housing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity. Cross hatching lines and/or surface shading lines may be used throughout the figures to denote different parts but not necessarily to denote the same or different materials.

As used herein, "proximate" refers to a direction inward, or generally, towards the reference component.

Evacuation systems of the present disclosure may comprise a softcover configured to secure an inflatable slide within a housing. In various embodiments, the softcover may include one or more fabric panel(s) coupled the housing. The fabric panel(s) have a plurality of straps configured to be located through apertures in the housing. The softcover may be coupled to the housing by securing the first straps to the housing. The softcovers and installation methods as disclosed herein may decrease installation time and/or reduce manufacturing costs.

Figure 1:
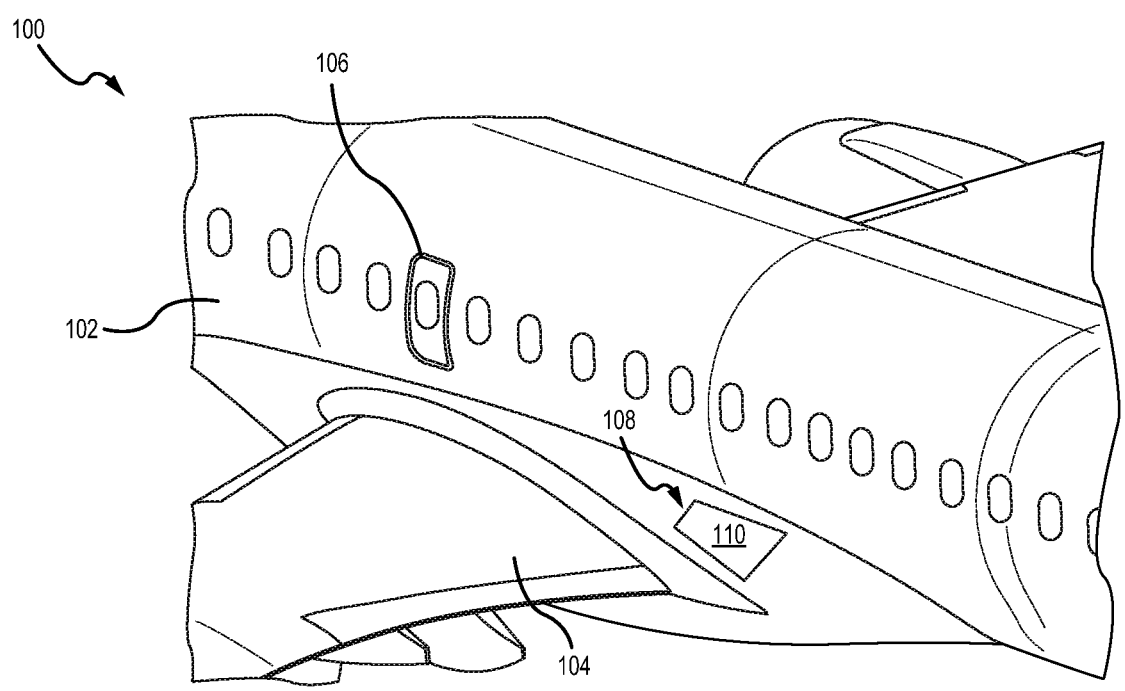
FIG. 1 illustrates an exemplary aircraft having an emergency evacuation system, in accordance with various embodiments.

Referring to FIG. 1, an exemplary aircraft 100 is shown, in accordance with various embodiments. Aircraft 100 may comprise a fuselage 102 with wings 104 fixed to fuselage 102. An emergency exit door 106 may be disposed on fuselage 102 over wing 104 such that passengers exiting emergency exit door 106 would exit onto wing 104. An evacuation system 108 may be disposed aft of emergency exit door 106. A panel 110 may cover evacuation system 108 when installed on aircraft 100. In response to emergency exit door 106 opening, or in response to another evacuation event, evacuation system 108 may jettison panel 110 and deploy an inflatable slide. In various embodiments, the inflatable slide may located within a housing (also referred to as a packboard), which may be mounted to aircraft 100.

Figure 2A:
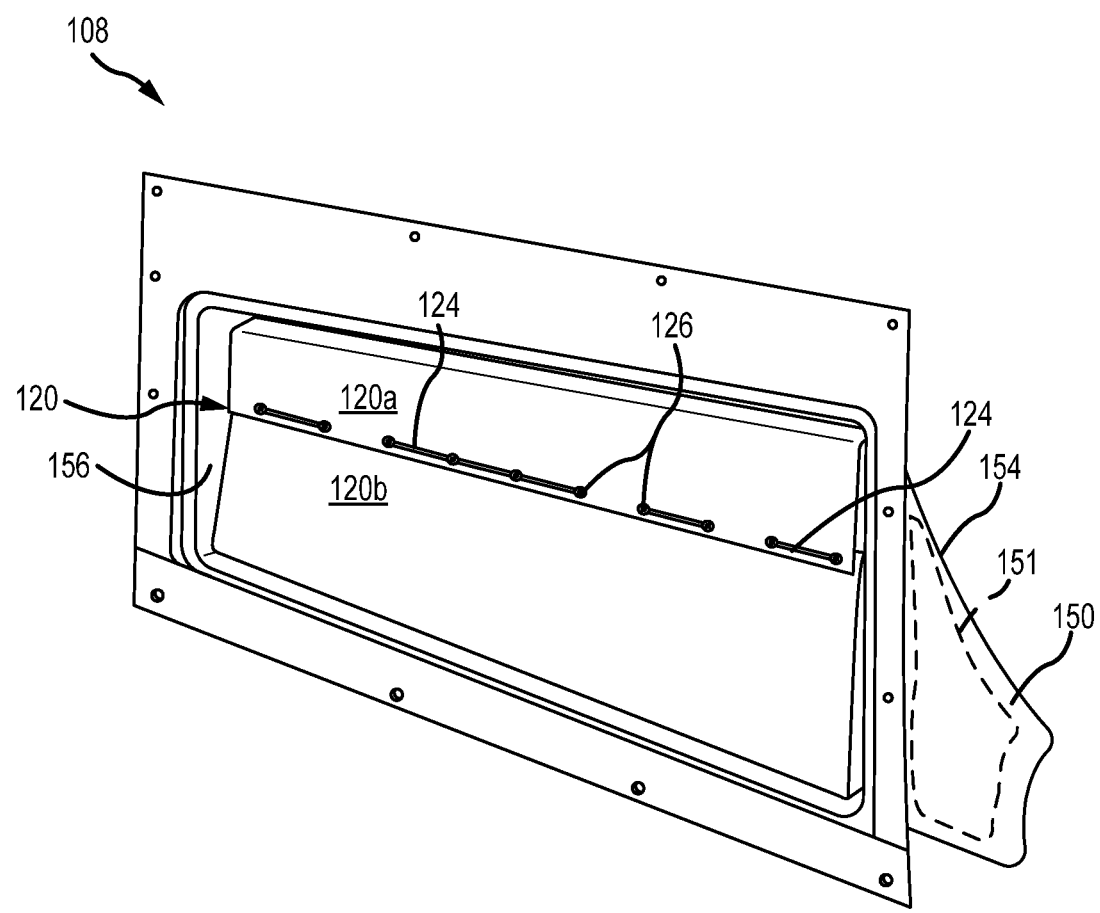
FIG. 2A illustrates an evacuation system including a softcover located over an inflatable slide, in accordance with various embodiments.

With reference to FIG. 2A, evacuation system 108 is shown as viewed from an outboard side, with panel 110 (of FIG. 1) removed, in accordance with various embodiments. Evacuation system 108 may comprise a softcover 120 and a housing 150. Housing 150 may be configured to receive and house an inflatable slide 151. Softcover 120 may be located over inflatable slide 151. Softcover 120 may be configured to contain inflatable slide 151 within an interior of housing 150. The interior of housing 150 is defined, at least partially, by internal surface 156 of housing 150.

Softcover 120 may include fabric panels 120a and 120b. A lace 124 may couple fabric panel 120a to fabric panel 120b, and close softcover 120 to retain inflatable slide 151. Lace 124 may be in configured in a daisy chain. For example, lace 124 may be configured in a series of loops with each loop extending (i.e., threaded) through a lace aperture 126 in fabric panels 120a and 120b and through an adjacent loop in the series. After a plurality of loops have been threaded together in this manner, a pin may close the daisy chain. In various embodiments, the pin may be slidably coupled to lace 124 such that lace 124 may unlace in response to a removal, or an uncoupling, of the pin from lace 124. In that regard, the pin may be located in a final or "key" loop to prevent lace 124 from unfurling, and pulling the pin out the key loop may release lace 124 and allow softcover 120 open (i.e., allow fabric panel 120a to separate from fabric panel 120b and release inflatable slide 151). In various embodiments, evacuation system 108 may include an actuator positioned to translate (i.e., pull) the pin and release inflatable slide 151.

Figure 2B:
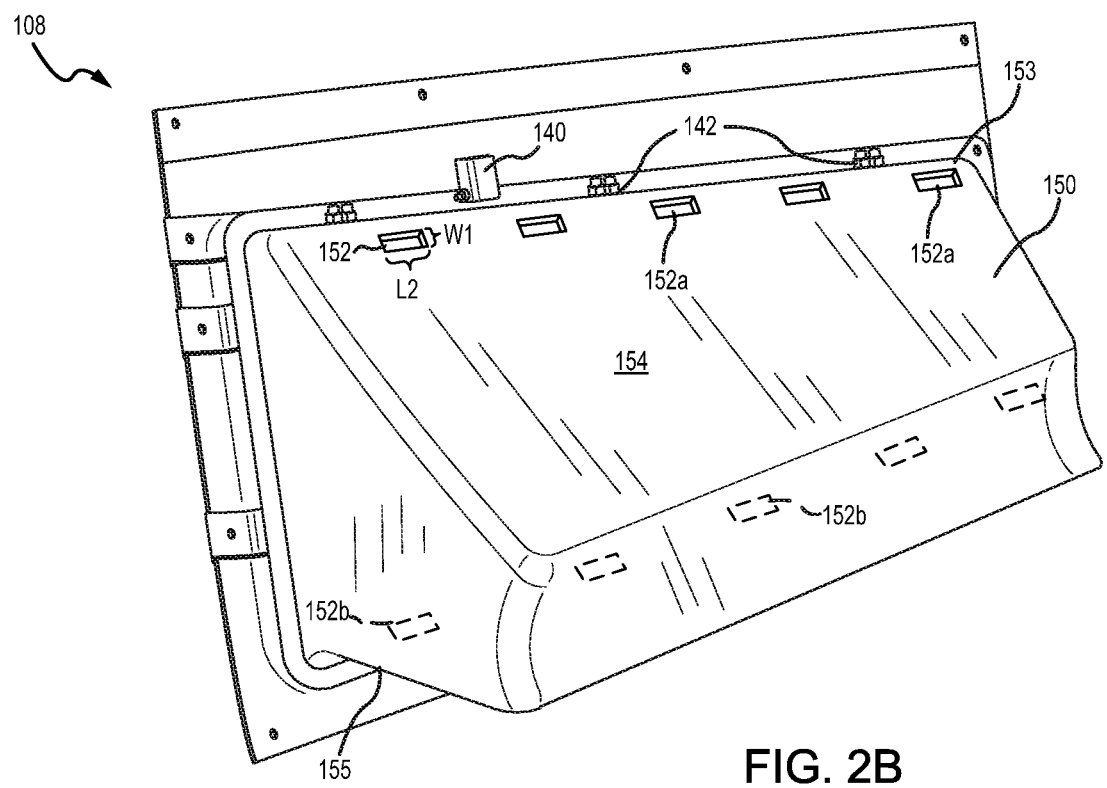
FIG. 2B illustrates an evacuation system housing configured to receive the softcover of FIG. 2A, in accordance with various embodiments.

With reference to FIG. 2B, housing 150 of evacuation system 108 is shown as viewed from an inboard direction, in accordance with various embodiments. An actuator 140 configured to open softcover 120 (of FIG. 2A) may be coupled to housing 150. Ball locks 142 may be coupled to housing 150 and configured to release panel 110 (of FIG. 1). In various embodiments, evacuation system 108 may include a charged tank configured to provide pressurized gas to inflate inflatable slide 151 (of FIG. 2A), motivate actuator 140, and release ball locks 142.

In various embodiments, housing 150 includes a plurality of apertures 152a formed proximate a top (or first end) 153 of housing 150, and a plurality of apertures 152b formed along a bottom (or second end) 155 of housing 150. Top 153 of housing 150 is oriented generally opposite bottom 155.

Apertures 152*a* and 152*b* extend completely through housing 150. In this regard, apertures 152*a* and 152*b* extend from an external surface 154 of housing 150 to an internal surface 156 (with momentary reference to FIG. 2A) of housing 150. External surface 154 is generally opposite internal surface 156. With combined reference to FIGS. 2A and 2B, the apertures 152*a* located along top 153 of housing 150 may be configured to secure fabric panel 120*a* to housing 150, and the apertures 152*b* located along bottom 155 of housing 150 may be configured to secure fabric panel 120*b* to housing 150.

Figure 3:
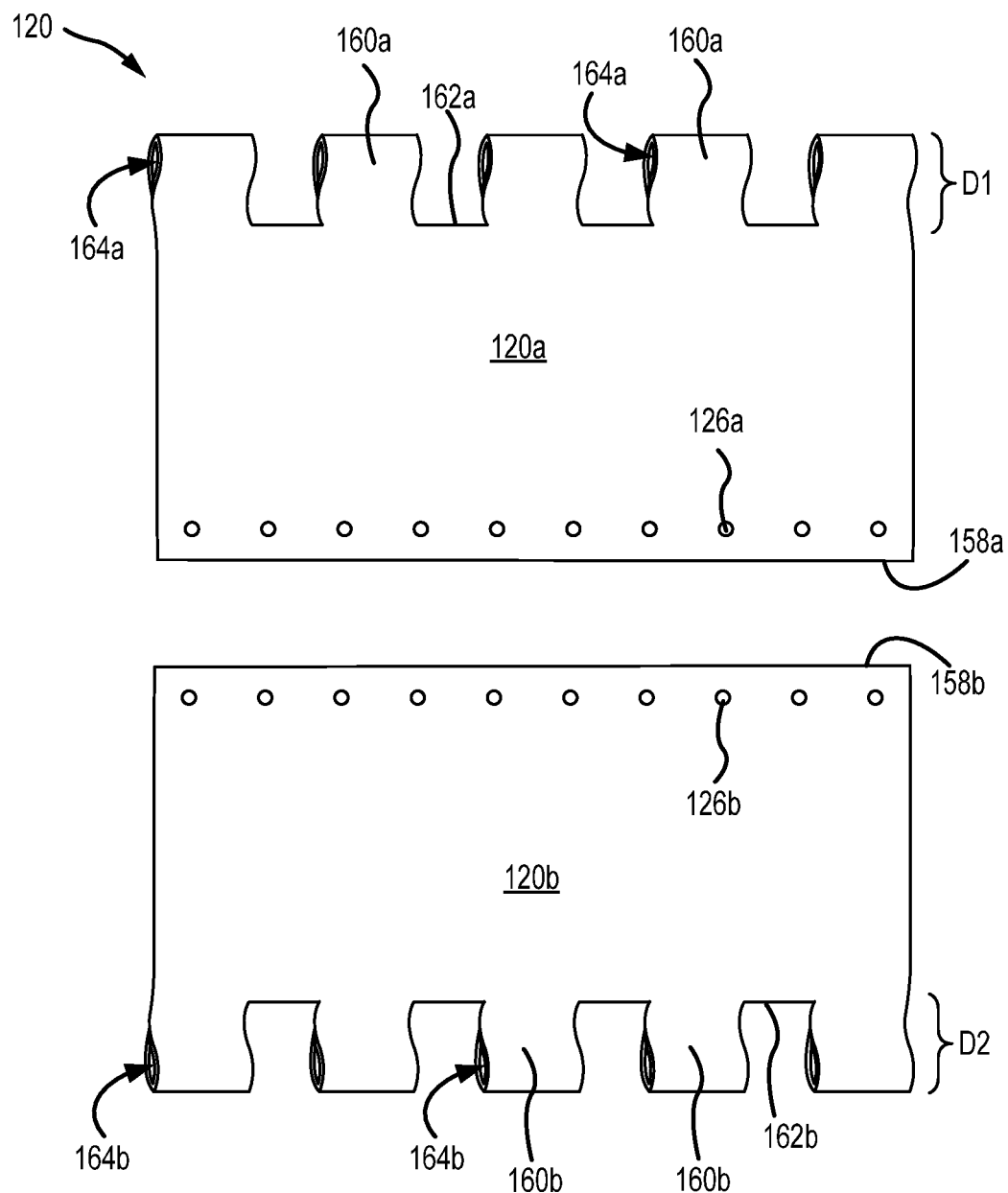
FIG. 3 illustrates a fabric panel of a softcover for an evacuation system, in accordance with various embodiments.

With reference to FIG. 3, fabric panels 120*a* and 120*b* of softcover 120 are illustrated, in accordance with various embodiments. In various embodiments, fabric panel 120*a* may include lace apertures 126*a*. Lace apertures 126*a* may be formed proximate to end 158*a* of fabric panel 120*a*. Fabric panel 120*b* may include lace apertures 126*b*. Lace apertures 126*b* may be formed proximate to end 158*b* of fabric panel 120*b*. Fabric panel 120*a* further includes one or more straps 160*a*. Straps 160*a* extend from an end 162*a* of fabric panel 120*a*. End 162*a* of fabric panel 120*a* is generally opposite end 158*a*. Straps 160*a* may be integral to fabric panel 120*a* or straps 160*a* may be coupled (e.g., sewn or otherwise fastened) to fabric panel 120*a*. Fabric panel 120*b* further includes a plurality of straps 160*b*. Straps 160*b* extend from an end 162*b* of fabric panel 120*b*. End 162*b* of fabric panel 120*b* is generally opposite end 158*b*. Straps 160*b* may be integral to fabric panel 120*b* or straps 160*b* may be coupled (e.g., sewn or otherwise fastened) to fabric panel 120*b*.

In various embodiments, straps 160*a* and 160*b* may be configured as loops. Stated differently, straps 160*a* may each define an opening 164*a*, and straps 160*b* may each define an opening 164*b*. Straps 160*a* and 160*b* may comprise rope, tape, ribbon, webbing, or any other type strap. Straps 160*a* and 160*b* may comprise nylon, ballistic nylon, polypropylene, polyester, cotton, or other suitable material.

With combined reference to FIGS. 2B and 3, when coupling fabric panels 120*a* and 120*b* to housing 150, end 162*a* of fabric panel 120*a* may be located along internal surface 156, proximate top end 153, and end 162*b* of fabric panel 120*b* may be located along internal surface 156, proximate bottom end 155, such that end 158*a* of fabric panel 120*a* is located proximate end 158*b* of fabric panel 120*b*. Straps 160*a* may extend a distance D1 from end 162*a* of fabric panel 120*a*. Straps 160*b* may extend a distance D2 from end 162*b* of fabric panel 120*b*. Distance D1 may be selected such that, when straps 160*a* are located through apertures 152*a*, at least a portion of each strap 160*a* will extend beyond external surface 154 of housing 150. Distance D2 may be selected such that, when straps 160*b* are located through apertures 152*b*, at least a portion of each strap 160*b* will extend beyond external surface 154 of housing 150. In various embodiments, D1 may be equal to distance D2. Distance D1 may also be greater than or less than distance D2.

Figure 4:
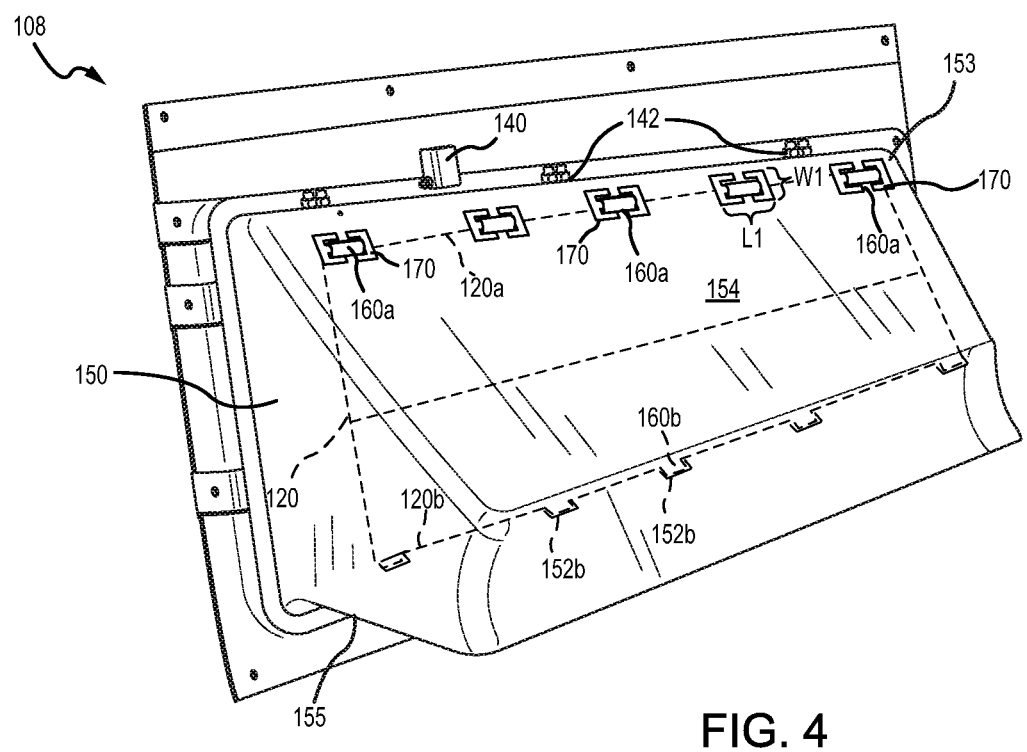
FIG. 4 illustrates brackets securing the softcover of FIG. 3 to a housing, in accordance with various embodiments.

With reference to FIG. 4, in various embodiments, brackets 170 may couple (i.e., secure) softcover 120 to housing 150. Brackets 170 may be coupled to straps 160*a*. For example, with momentary combined reference to FIGS. 3 and 4, a portion of brackets 170 may be located through openings 164*a*. Brackets 170 may be configured to couple fabric panel 120*a* to housing 150. In this regard, brackets 170 may be located on external surface 154, along top end 153 of housing 150. While FIG. 4 and the securement of softcover 120 to housing 150 are described with reference to elements and features of fabric panel 120*a* and top end 153, it should be understood that fabric panel 120*b* and bottom end 155 may include the elements and features as described herein with respect to fabric panel 120*a* and top end 153 (i.e., brackets 170 may also be coupled to straps 160*b* and located over external surface 154 along bottom end 155 of housing 150).

With combined reference to FIG. 2B and FIG. 4, in various embodiments, at least one dimension of bracket 170 is greater than the corresponding dimension of aperture 152. For example, in various embodiments, bracket 170 comprises a length L1 which is less than a length L2 of aperture 152, and bracket 170 comprises a width W1 which is greater than a width W2 of aperture 152. Length L2 and width W1 of bracket 170 may be configured such that, when securing fabric panel 120*a* to top end 153 of housing 150, the brackets 170 attached to straps 160*a* may be slid through apertures 152*a* in a first direction (i.e., from internal surface 156 to external surface 154), then pivoted such that brackets 170 are in contact with external surface 154 and are prevented from traveling back through apertures 152*a* in a second opposite direction (i.e., from external surface 154 to internal surface 156).

Figure 5:
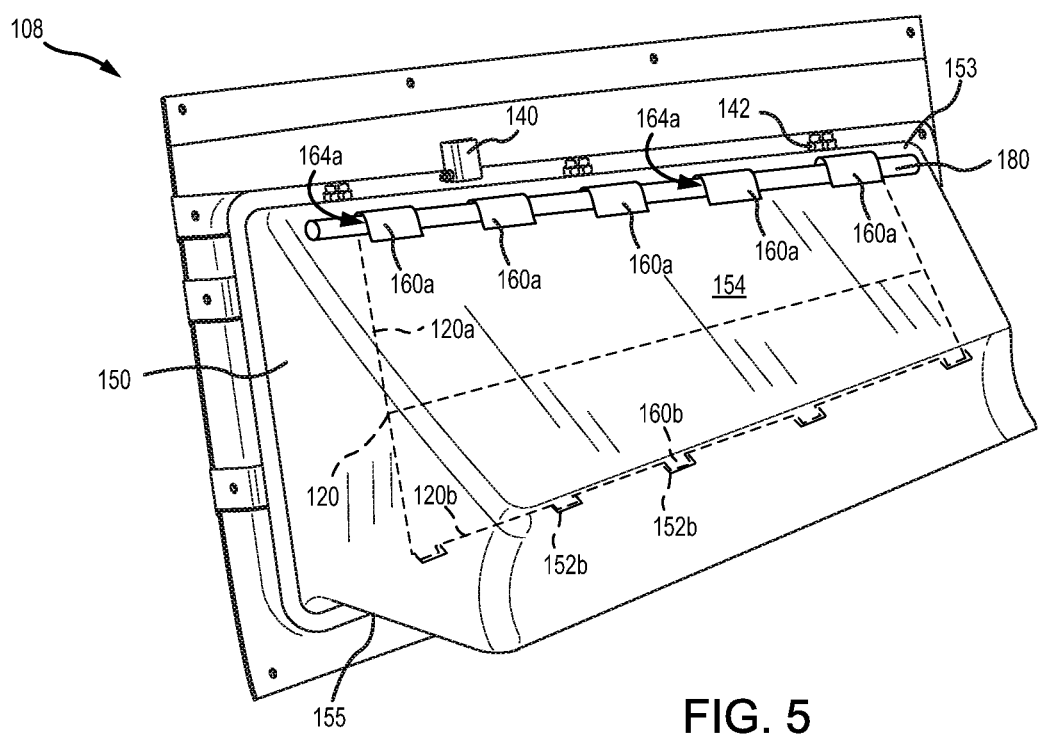
FIG. 5 illustrates a rod securing the softcover of FIG. 3 to a housing, in accordance with various embodiments.

With reference to FIG. 5, in various embodiments, a rod 180 may couple (i.e., secure) softcover 120 to housing 150. Rod may be coupled to straps 160*a*. For example, with momentary combined reference to FIGS. 3 and 5, rod 180 may be located through openings 164*a* in straps 160*a*. Rod 180 may be configured to couple fabric panel 120*a* to housing 150. In this regard, rod 180 may be located on external surface 154, along top end 153 of housing 150. When coupling fabric panel 120*a* to housing 150, straps 160*a* may be slid through apertures 152*a* in a first direction (i.e., from internal surface 156 to external surface 154) such that a portion of straps 160 is over external surface 154, rod 180 may then be located through openings 164*a* such that rod 180 prevents straps 160*a* from traveling back through apertures 152*a* in a second opposite direction (i.e., from external surface 154 to internal surface 156). While FIG. 5 and the securement of softcover 120 to housing 150 are described with reference to elements and features of fabric panel 120*a* and top end 153, it should be understood that fabric panel 120*b* and bottom end 155 may include the elements and features as described herein with respect to fabric panel 120*a* and top end 153 (i.e., a rod may also be coupled to straps 160*b* and located over external surface 154 along bottom end 155 of housing 150).

Figure 6A:
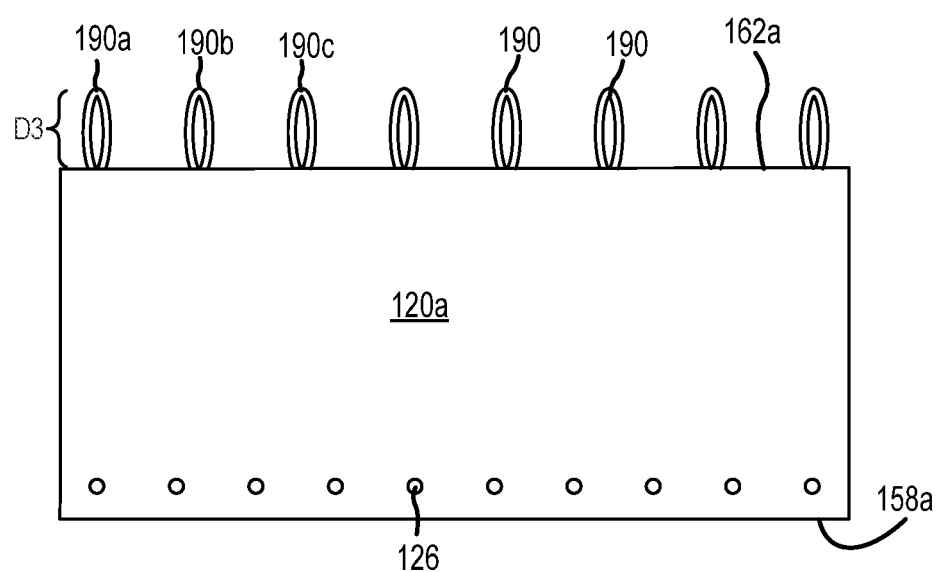
FIG. 6A illustrates a fabric panel of a softcover for an evacuation system, in accordance with various embodiments.

With reference to FIG. 6A, in various embodiments, fabric panel 120*a* may include one or more straps or chords 190. Chords 190 may each be configured as a loop. Chords 190 may be integral to fabric panel 120*a* or chords may be coupled (e.g., sewn or otherwise fastened) to fabric panel 120*a*. Chords 190 may comprise rope, wire, lace, or other type chord. Chords 190 may comprise nylon, ballistic nylon, polypropylene, polyester, cotton, metal, fluoropolymer, polytetrafluoroethylene (PTFE), composites, or other suitable material. Chords 190 each extend a distance D3 from end 162*a* of fabric panel 120*a*. In various embodiments, distance D3 may be the same for each chord 190. In various embodiments, distance D3 may vary such that some chords 190 may extend further from end 162*a* than other chords 190. Distance D3 of each chord 190 may be selected such that when securing fabric panel 120*a* to housing 150, chords 190 may be configured in a daisy chain, as shown in FIG. 6B.

Figure 6B:
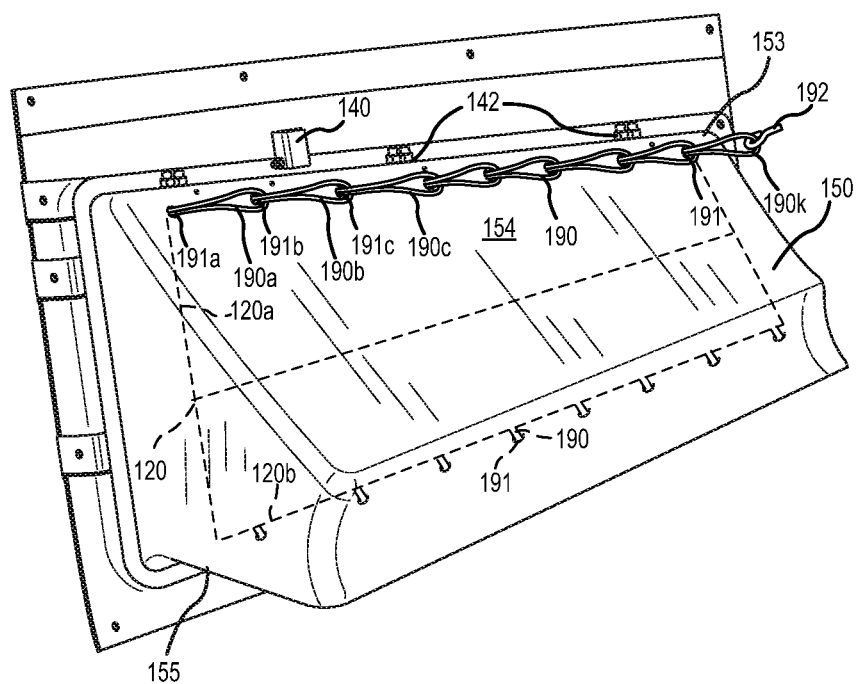
FIG. 6B illustrates the softcover of FIG. 6A secured to a housing, in accordance with various embodiments.

With reference to FIG. 6B, in various embodiments, chords 190 may couple (i.e., secure) softcover 120 to housing 150. Chords 190 may be in configured in a daisy chain over external surface 154 of housing 150. For example, chords 190 may be configured in a series loop with each chord extending (i.e., threaded) through an aperture 191 in housing 150 and through an adjacent chord in the series. For example, a first chord 190a may extend through a first aperture 191a in housing 150, a second chord 190b may extend through a second aperture 191b and through first chord 190a. A third chord 190c may extend through a third aperture 191c and through second chord 190b. After the loops have been threaded together in this manner, a shackle 192 may close the daisy chain. Shackle may be coupled to chords 190 such that chords 190 may not unlace. In that regard, shackle may be located in a final or "key" chord 190k to prevent chords 190 from unfurling.

While FIGS. 6A and 6B are described with reference to elements and features of fabric panel 120a and top end 153 of housing 150, it should be understood that fabric panel 120b and bottom end 155 may include the elements and features as described herein with respect to fabric panel 120a and top end 153 (i.e., fabric panel 120b may include one or more chords, similar to chords 190, configured to form a daisy chain over external surface 154 and secure fabric panel 120b to bottom end 155 of housing 150).

Figure 7:
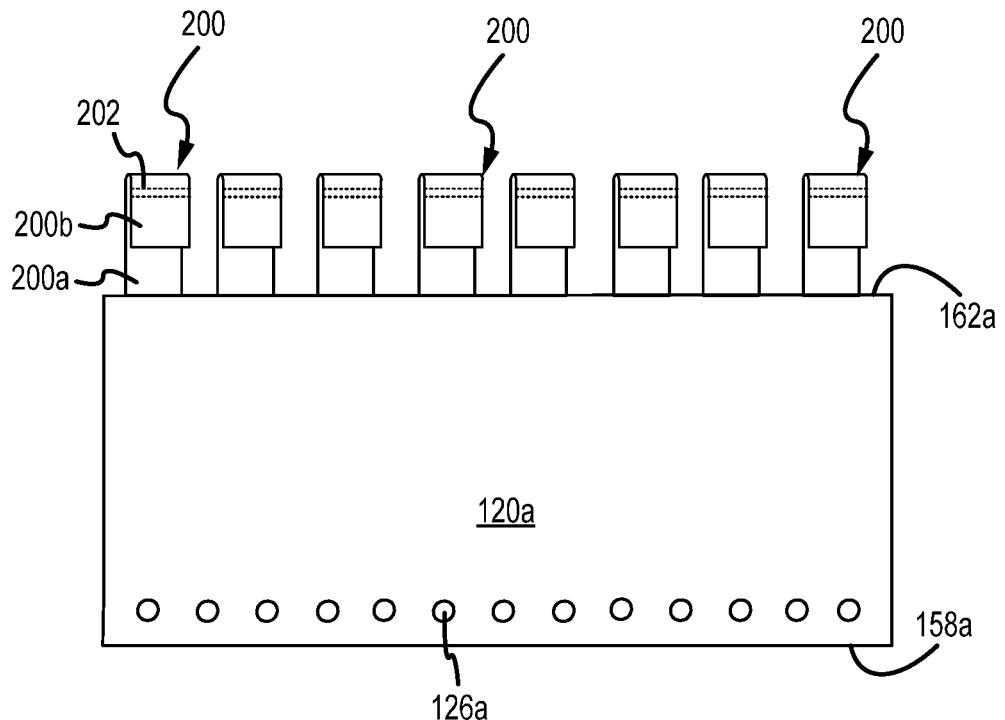
FIG. 7 illustrates a fabric panel of a softcover for an evacuation system, in accordance with various embodiments.

With reference to FIG. 7, in various embodiments, fabric panel 120a may include one or more straps 200. Straps 200 may each include a first portion 200a and a second portion 200b. Second portion 200b may be sewn to first portion 200a at stitching 202. In various embodiments, second portion 200b may be integral to first portion 200a (e.g., strap 200 may be folded and stitched). Straps 200 may be integral to fabric panel 120a or straps 200 may be coupled (e.g., sewn or otherwise fastened) to fabric panel 120a. Straps 200 may comprise rope, tape, ribbon, webbing, or any other type strap. Straps 200 may comprise nylon, ballistic nylon, polypropylene, polyester, cotton, composites, or other suitable material.

Figure 8A:
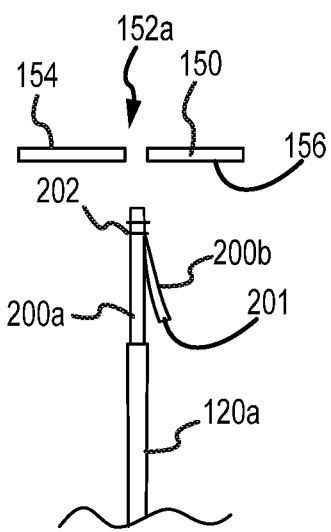
FIGS. 8A and 8B illustrate a cross-section view of the fabric panel of FIG. 7 being attached to a housing, in accordance with various embodiments.
Figure 8B:
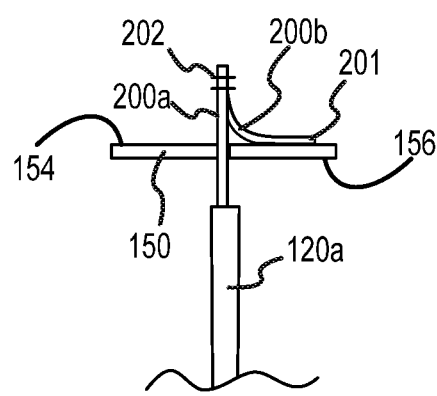

FIG. 8A illustrates a side view of fabric panel 120a prior to attachment to housing 150. In preparation for attachment of fabric panel 120a, straps 200 are aligned with apertures 152b, with an end 201 of second portion 200b located proximate to first portion 200a. FIG. 8B illustrates a side view of fabric panel 120a attached to housing 150. In various embodiments, second portion 200b of strap 200 may be configured to extend away from first portion 200a, such that when securing fabric panel 120a to housing 150, straps 200 are slid through apertures 152a in a first direction (i.e., from internal surface 156 to external surface 154) until portion second 200b is completely through aperture 152a (i.e., until all of second portion 200b over external surface 154). After second portion 200b is through apertures 152a, end 201 of second portion 200b is extended away from first portion 200a, such that second portion 200b is on and/or contacting external surface 154.

Figure 9:
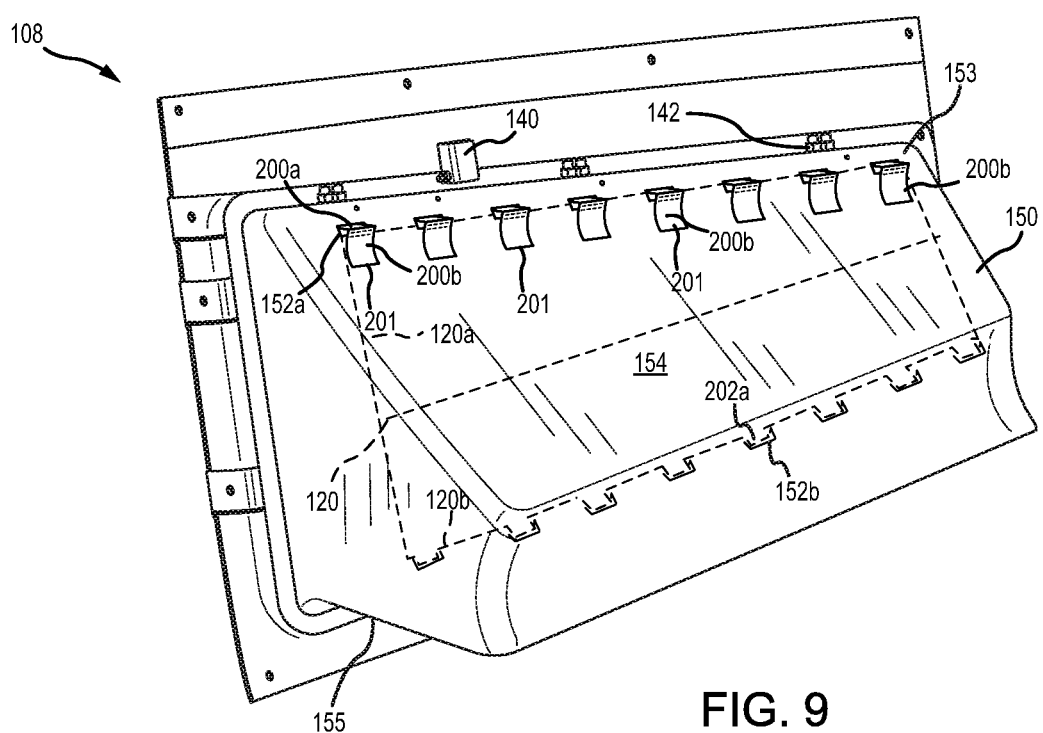
FIG. 9 illustrates the softcover of FIG. 7 secured to a housing, in accordance with various embodiments.

FIG. 9 illustrates a perspective view of attached softcover 120 coupled to housing 150, in accordance with various embodiments. In various embodiments straps 200 may be configured, for example, a stiffness or rigidity of straps 200 and a length of second portion 200b may be selected, such that locating second portion 200b on external surface 154 of housing 150 prevents second portion 200b from traveling back through aperture 152a (i.e., in a directed from external surface 154 to internal surface 156). In this regard, locating second portion 200b on external surface 154, along top end 153 of housing 150 may secure fabric panel 120a to housing 150.

While FIGS. 7, 8A, 8B, and 9 are described with reference to elements and features of fabric panel 120a and top end 153 of housing 150, it should be understood that fabric panel 120b and bottom end 155 of housing 150 may include the elements and features as described herein with respect to fabric panel 120a and top end 153 (i.e., fabric panel 120b may include one or more straps, similar to straps 200, configured to extend onto external surface 154 secure fabric panel 120b to bottom end 155 of housing 150).

Figure 10:
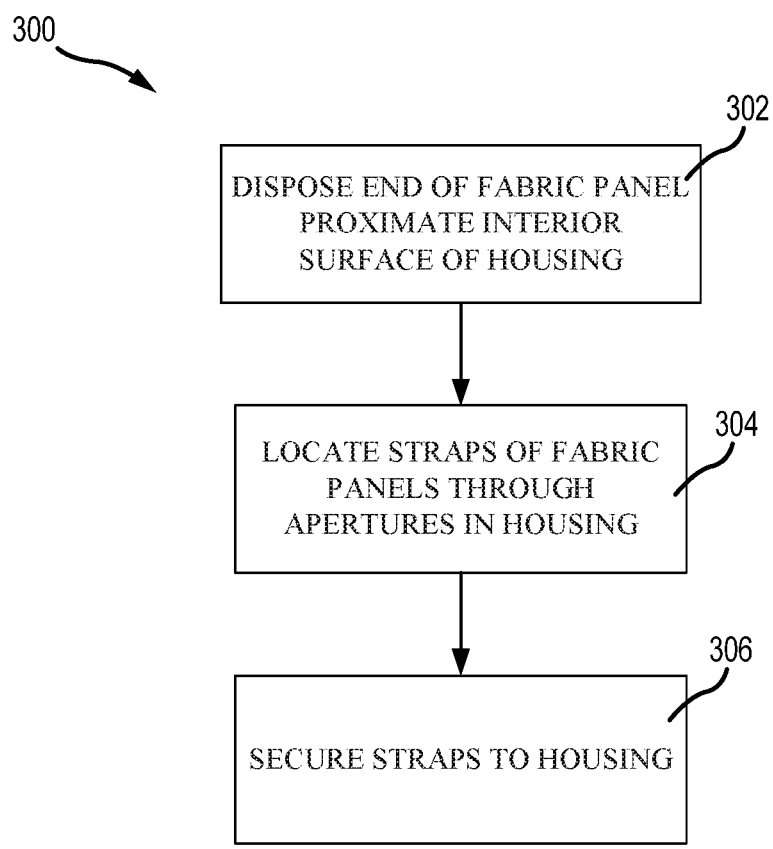
FIG. 10 illustrates a method installing a softcover in an evacuation system, in accordance with various embodiments.

FIG. 10 illustrates a method 300 of installing a softcover in an evacuation system is illustrated, in accordance with various embodiments. Method 300 may include disposing an end of a first fabric panel proximate an internal surface of a housing (step 302). Method 300 may further include locating a plurality of straps of the first fabric panel through a plurality of apertures formed through the housing (step 304), and securing the plurality of straps to the housing (step 306).

With combined reference to FIG. 10 and FIGS. 2B and 3, in various embodiments, step 302 may comprise disposing end 162a of fabric panel 120a proximate internal surface 156 of housing 150. Step 304 may comprise locating straps 160 through apertures 152a. Step 306 may comprise securing straps 160 to housing 150. In various embodiments, steps 302, 304, and 306 may be repeated for fabric panel 120b (i.e., end 162b of fabric panel 120b may be located proximate internal surface 156, straps 160b may be located through apertures 152b and secured to housing 150).

With combined reference to FIG. 10 and FIG. 4, in various embodiments, brackets 170 may be coupled to the straps 160a and step 306 may comprise locating brackets 170 over external surface 154. With combined reference to FIG. 10 and FIG. 5, in various embodiments, step 306 may comprise locating rod 180 through straps 160a.

With combined reference to FIG. 10 and FIG. 6B, in various embodiments, the straps may comprise chords 190 and step 306 may comprise configuring chords 190 in a daisy chain over external surface 154 and securing shackle 192 to a key loop (i.e., key chord 190k) in the daisy chain.

With combined reference to FIG. 10 and FIG. 9, In various embodiments, the straps may comprise first portion 200a extending from end 162a and second portion 200b attached to first portion 200a and step 306 may comprise locating second portion 200b over external surface 154.

Securing the straps of fabric panels 120a and 120b to the housing decrease installation time for softcover 120 and/or reduce manufacturing costs of evacuation system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
   a housing configured to receive an inflatable slide, the housing defining a first aperture, formed proximate a first end of the housing and a second aperture formed proximate a second end of the housing, the first end disposed opposite the second end; and
   a softcover coupled to the housing, the softcover comprising a first fabric panel and a second fabric panel,
   wherein the first fabric panel comprises a first strap extending from a first end of the first fabric panel, and wherein the first strap is located through the first aperture of the housing such that at least a portion of the first strap extends beyond an external surface of the housing whereby the first fabric panel is secured to the housing; and
   the second fabric panel comprises a second strap extending from a first end of the second fabric panel, and wherein the second strap is located through the second aperture of the housing such that at least a portion of the second strap extends beyond the external surface of the housing whereby the second fabric panel is secured to the housing.

2. The evacuation system of claim 1, wherein the first fabric panel comprises a plurality of chords extending from the first end of the first fabric panel, the plurality of chords including the first strap, and wherein the plurality of chords are configured in a daisy chain.

3. The evacuation system of claim 1, further comprising a lace coupling the first fabric panel to the second fabric panel.

4. The evacuation system of claim 1, wherein the first strap comprises:
   a first portion extending through the first aperture of the housing, the first portion comprises the at least a portion of the first strap; and
   a second portion stitched to the first portion, wherein an end of the second portion is disposed on an external surface of the housing.

5. The evacuation system of claim 1, wherein a second end of the first fabric panel is coupled to a second end of the second fabric panel to close the softcover to retain the inflatable slide.

6. The evacuation system of claim 1, further comprising a bracket coupled to the first strap.

7. The evacuation system of claim 6, wherein a length of the bracket is less than a length of the first aperture, and wherein a width of the bracket is greater than a width of the first aperture.

8. The evacuation system of claim 1, further comprising a rod located through the first strap.

9. The evacuation system of claim 8, wherein the rod is located externally from the housing.

* * * * *